(12) United States Patent
Pandit et al.

(10) Patent No.: US 12,731,205 B2
(45) Date of Patent: Sep. 8, 2026

(54) METHOD FOR MANAGING A GRAPHICAL PROCESSING UNIT (GPU)

(71) Applicant: QUALCOMM Incorporated, San Diego, CA (US)

(72) Inventors: Rutwik Nilesh Pandit, Mumbai (IN); Shashidhar Belakudi, Belgaum (IN); Vivekanandan Naveen, Bangalore (IN)

(73) Assignee: Qualcomm Incorporated, San Diego, CA (US)

( * ) Notice: Subject to any disclaimer, the term of this patent is extended or adjusted under 35 U.S.C. 154(b) by 154 days.

(21) Appl. No.: 18/664,775

(22) Filed: May 15, 2024

(65) Prior Publication Data

US 2025/0356449 A1 Nov. 20, 2025

(51) Int. Cl.
*G06T 1/20* (2006.01)

(52) U.S. Cl.
CPC .................................... *G06T 1/20* (2013.01)

(58) Field of Classification Search
CPC ....... G06T 1/20; G06F 1/3225; G06F 1/3243; G06F 1/324
USPC .......................... 345/522; 713/300; 709/224
See application file for complete search history.

(56) References Cited

U.S. PATENT DOCUMENTS

2008/0235364 A1* 9/2008 Gorbatov ............... G06F 1/324 709/224
2011/0320839 A1* 12/2011 David .................. G06F 1/3225 713/340
2013/0007379 A1* 1/2013 Kegel ..................... G06F 21/78 711/E12.001
2014/0043989 A1* 2/2014 Dalsgaard ............ H04W 24/00 370/252
2014/0089699 A1* 3/2014 O'Connor ............. G09G 5/363 713/300
2017/0142709 A1* 5/2017 Lake ................ H04W 72/0446
2019/0042878 A1 2/2019 Sheller et al.
2020/0249878 A1* 8/2020 Bismuth ............... G06F 3/0661
2021/0112038 A1 4/2021 Karame et al.
2021/0200453 A1* 7/2021 Li ....................... G06F 12/0246

(Continued)

FOREIGN PATENT DOCUMENTS

CN 116305090 A 6/2023

OTHER PUBLICATIONS

International Search Report and Written Opinion—PCT/US2025/019856—ISA/EPO—Jun. 17, 2025.

(Continued)

*Primary Examiner* — Prabodh M Dharia
(74) *Attorney, Agent, or Firm* — Muncy, Geissler, Olds & Lowe, P.C.

(57) ABSTRACT

Various aspects include methods for managing a processing core of a computing device. Various aspects may include monitoring at least two operational parameters of a system interface between the processing core and memory, determining whether a bandwidth parameter satisfies a first threshold, based on the at least two operational parameters, and reducing an operating condition of the processing core in response to determining the bandwidth parameter satisfies the first threshold. In some aspects, the processing core may be a graphical processing unit (GPU) and the bandwidth parameter may depend on parameters determined based on a processing load associated with a type of operations being performed by the GPU.

20 Claims, 8 Drawing Sheets

(56) References Cited

U.S. PATENT DOCUMENTS

| | | | | |
|---|---|---|---|---|
| 2022/0255828 | A1* | 8/2022 | Li | H04L 43/0894 |
| 2022/0269942 | A1 | 8/2022 | Gu et al. | |
| 2022/0393483 | A1* | 12/2022 | Koti | H02J 7/00032 |
| 2022/0414223 | A1 | 12/2022 | Liu et al. | |
| 2024/0232594 | A1* | 7/2024 | Yang | G06N 5/01 |
| 2024/0371050 | A1* | 11/2024 | Zhuang | G06F 3/03545 |

OTHER PUBLICATIONS

Mo F., et al., "DarkneTZ: Towards Model Privacy at the Edge using Trusted Execution Environments", Proceedings of the 18th International Conference on Mobile Systems, Applications, and Services Jun. 2020, pp. 161-174.

* cited by examiner

METHOD FOR MANAGING A GRAPHICAL PROCESSING UNIT (GPU)

BACKGROUND

Developers and users of computing devices are continually seeking improved operation performance and endurance. The innovation and speed of GPUs have accelerated in recent years due to increased demand for their processing capabilities for artificial intelligence training and other computing operations.

SUMMARY

Various aspects may include methods performed by a processing device for managing a processing core, such as a graphical processing unit (GPU), central processing unit (CPU), neural network processing unit (NPU), etc. Various aspects may include monitoring at least two operational parameters of a system interface between the processing core and a memory, determining whether a bandwidth parameter satisfies a first threshold, the bandwidth parameter being based on the at least two operational parameters, and reducing an operating condition of the processing core in response to determining the bandwidth parameter satisfies the first threshold.

Some aspects may further include monitoring an execution performance of the processing core at the reduced operating condition, determining whether a change in the execution performance satisfies a second threshold, increasing the operating condition of the processing core in response to determining that the execution performance satisfies the second threshold, and continue monitoring the at least two operational parameters of the system interface in response to determining that the execution performance does not satisfy the second threshold. In some aspects, the monitored execution performance may be a rate of instructions retired from a register. In some aspects, the processing core may be a GPU.

In some aspects, the at least two operational parameters may be two of an average memory latency of the memory, a processing core read bandwidth of the system interface, or an arithmetic logic unit (ALU) utilization of the processing core. In some aspects, the operating condition may be a frequency of clock signals provided to the processing core. In some aspects, reducing the operating condition of the processing core may include reducing an execution rate of the processing core by a predetermined number of executions per unit time. In some aspects, the bandwidth parameter may depend upon parameters determined based on a processing load associated with a type of operations being performed by the processing core.

Further aspects include a computing device including a system interface that includes a traffic monitor that is configured to perform operations of any of the methods summarized above. Further aspects include a computing device including means for performing functions of any of the methods summarized above. Further aspects include a processing core controller and a system interface controller for use in a computing device; the processing core controller and the system interface controller each including a processor configured to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given and the detailed description, serve to explain the features therein.

DETAILED DESCRIPTION

Figure 1:
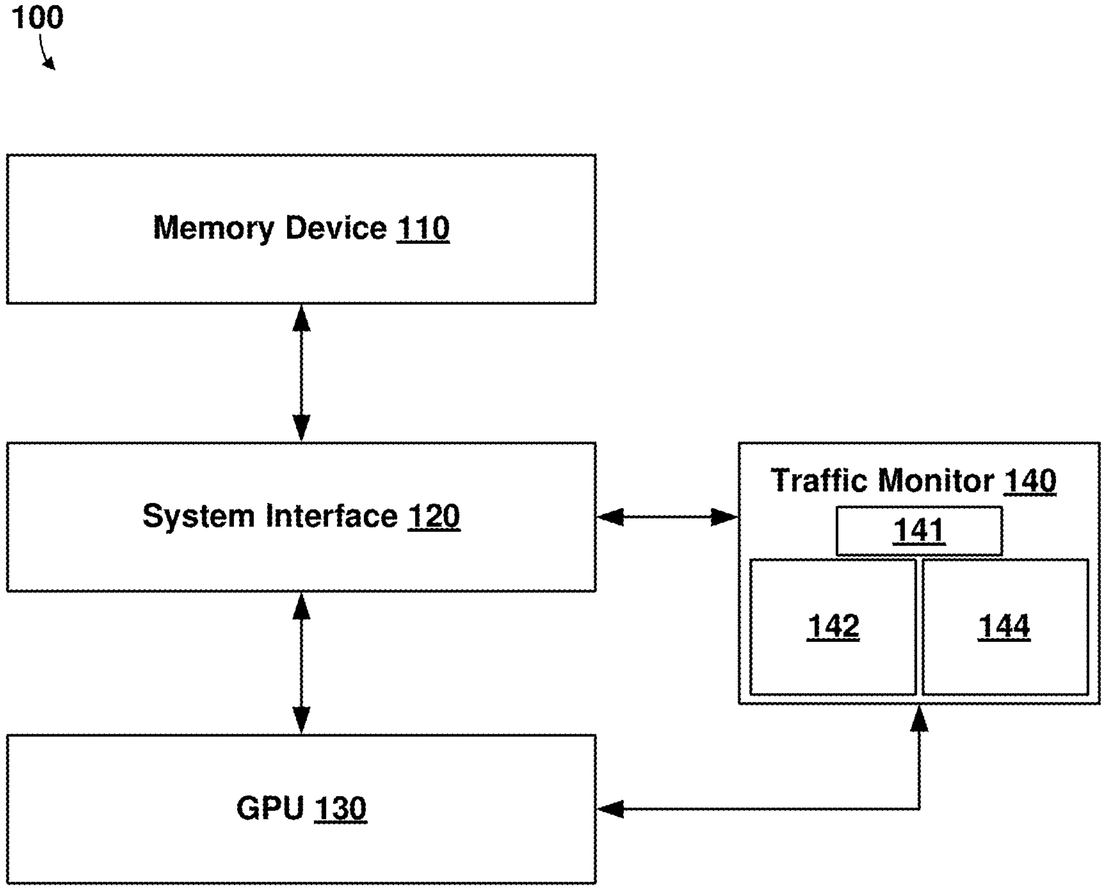
FIG. 1 is a system block diagram illustrating a GPU management system suitable for implementing any of the various embodiments.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the claims.

Various embodiments include methods, and computing devices implementing such methods for managing a processing core, such as a graphical processing unit (GPU), central processing unit (CPU), neural network processing unit (NPU), etc. In some embodiments, the processing core may be or include a GPU. Embodiments may include monitoring at least two operational parameters of a system interface between the processing core and memory, determining whether a bandwidth parameter satisfies (e.g., meets or exceeds) a first threshold, based on the at least two operational parameters, and reducing an operating condition of the processing core in response to determining the bandwidth parameter satisfies (e.g., meets or exceeds) the first threshold. Some embodiments may include monitoring the execution performance of the processing core at the reduced operating condition. Some embodiments may include determining whether a change in the execution performance satisfies (e.g., meets or exceeds) a second threshold. Some embodiments may include increasing the operating condition of the processing core in response to determining that the execution performance satisfies (e.g., meets or exceeds) the second threshold.

Some embodiments may be particularly useful for GPU processing cores due to the variability in processing loads that GPUs experience depending upon the type of operations application executing within the computing device. The GPU of a computing device performs processing loads with arrays of arithmetic logic units (ALUs) that are designed for processing graphics vectors, processing machine learning propagation and back-propagation, and other math-intensive operations. Such vector processing capabilities are well suited to gaming, virtual reality, and artificial intelligence (AI) machine learning (ML) application. However, the processing loads of GPUs supporting gaming and virtual reality applications are significantly greater than processing loads of AI/ML applications. This variability in processing loads of GPU depending upon the type of operations on the GPU or type of application executing on the computing device makes GPUs a good example of processing cores for describing the operations and benefits of various embodiments. Therefore, the following descriptions refer to GPU processors and GPU processes; however, these references are for ease of description and not intended to limit the scope of the claims unless a GPU is specifically recited in claims.

The ALUs of a GPU may operate according to a clock rate set point that may define the operations per unit of time that the GPU processes. The ALU processing rate may exceed the rate at which the system interface can fetch the needed input data and/or write the resulting solutions calculated at the GPU and may exceed the rate at which memory can provide input data and/or place the resulting solutions in memory. Either of these limitations external to the GPU may limit the bandwidth of data transmitted off the GPU and may limit the performance of the GPU for the system. When the bandwidth through the interface or to memory locations is the limiting factor, ALUs that continue to operate at a clock rate that produces solutions faster than they can be transported to memory may be wasted processing.

Various embodiments address and overcome the foregoing problems of inefficiently using a GPU during workloads that are memory or interface-constrained by monitoring at least two operational parameters of a system interface between the GPU and memory, determining whether a bandwidth parameter satisfies (e.g., meets or exceeds) a first threshold based on the at least two operational parameters, and reducing an operating condition of the GPU in response to determining the bandwidth parameter satisfies (e.g., meets or exceeds) the first threshold. Various embodiments enable a GPU device to select a lower clock speed based on external factors. This enables a GPU device to reduce power consumption and work more cooperatively at the same rate as the system memory allows.

The GPU subsystem may be composed of multiple streaming processors (SPs), each functioning as a Single Instruction, Multiple Threads (SIMT) processor. These processors may access a multi-level memory hierarchy, which includes local memories and global memories. The traffic to and from the global memories may be managed through the system bus and memory interface, which is shared among various subsystems such as the CPU, GPU, and network signal processor (NSP). Network-on-Chip Performance Monitoring Unit (NOC PMU) hardware counters may be connected to the system interface to monitor and track the performance metrics related to the system bus-memory interface transactions.

For metrics specific to the GPU, such as ALU utilization, memory latency, and bandwidth, GPU PMU (Performance Monitoring Unit) counters may be connected to the GPU. The term "GPU ALU throughput" may refer to the product of the SP clock speed (SP CLK), Instructions Per Cycle (IPC), and the number of processors (Num). "GPU Memory throughput" is determined by the memory clock speed (Memory CLK) multiplied by the memory bitrate. Another metric of actual processing rate is retired instructions, which is the rate of instructions successfully processed and their results placed in memory. These metrics describe the performance and efficiency of the GPU subsystem.

A generalized bandwidth parameter may be calculated based on average memory latency, average read bandwidth, and average ALU utilization. To calculate the bandwidth parameter or operating state of the GPU, the bandwidth monitor may evaluate various factors such as threshold memory latency, GPU read operation bandwidth, available GPU read operation bandwidth, ALU utilization threshold, and a measure of ALU utilization. Based on a composite metric like the bandwidth parameter, the GPU may determine whether the GPU is memory-bound or latency-bound. In some cases, external capacity limits in an interface or memory may limit the GPU calculation rate, instruction retirement rate, and ALU utilization rate. Continued operation at a high clock rate (e.g., maximum clock rate) while constrained elsewhere would waste power at the GPU since not all ALUs can be utilized at that clock rate. Various embodiments provide a process by which the operating point of the GPU can be lowered without losing performance in these scenarios. The reduction in operating conditions may take different forms, such as reducing an execution rate of the GPU by a predetermined number of executions per unit time, adjusting other parameters based on the processing load associated with a type of operations (e.g., gaming, graphics rendering, virtual reality, AI/ML, etc.) being performed by the GPU, or reducing a clock rate of the GPU or ALUs of the GPU.

Various embodiments may increase the GPU subsystem's power efficiency when running workloads that are limited by the memory subsystem or the system interface, but not limited by the GPU's arithmetic logic units (ALUs). Various embodiments dynamically adjust the GPU's operating point based on a composite metric measured continuously by a bandwidth monitor that evaluates the characteristics of the workload and the available bandwidth on the system interface. This allows for more efficient management of the GPU subsystem regardless of the memory access pattern or level of ALU utilization. Some embodiments may verify that the operating point adjustment does not degrade the performance of the GPU subsystem beyond a predetermined threshold by comparing the instructions retired per cycle before and after the adjustment.

Reducing operating conditions may negatively affect the GPU's performance if done too aggressively. However, reducing frequency or clock speed can help reduce power consumption while still maintaining acceptable performance levels. An example of how this could be implemented is by reducing the GPU's clock speed from 1 GHz to 800 MHz when the bandwidth parameter satisfies (e.g., meets or exceeds) a first threshold indicating a constraint outside the GPU. The specific implementation may depend on the type of workload being performed and the available bandwidth on the system interface.

In addition to managing the GPU's operating condition based on the bandwidth parameter, some embodiments may dynamically adjust (or re-adjust) the GPU's clock and voltage based on execution performance. This adjustment may be performed after an adjustment associated with the bandwidth parameter to confirm a proper operating set point or periodically for the GPU subsystem by evaluating the specific workload being performed and ensuring that the GPU is not underutilized or over-clocked.

Some embodiments may include monitoring the GPU's execution performance while it is running at the reduced operating condition determined based on the bandwidth parameter. Once the second threshold for execution performance has been satisfied, indicating the GPU is no longer externally constrained (e.g., by memory or interface), the operating condition of the GPU may be increased to improve GPU performance. The specific implementation may depend on the type of workload (e.g., gaming, graphics rendering, virtual reality, AI/ML, etc.) being performed and the available bandwidth on the system interface.

The process and bandwidth monitor may incorporate feedback from both the GPU and the system interface in determining how to balance the throughput of the memory device and the GPU, allowing for more efficient management of the GPU subsystem. The bandwidth monitor may determine whether to reduce or increase the GPU's clock and voltage based on the specific characteristics of the workload being performed and current performance metrics received from the GPU and GPU-memory interface.

As used herein, the term "threshold" refers to a value, condition, or state at which an action should be taken, a determination made, or a state change initiated by a processing device implementing an embodiment method. Thresholds may be values, such as integers or floating point numbers to which counts, measurements, sensor readings, and other variables are compared by the processing device to determine whether an action or change should be initiated. Thresholds may be maximum values that indicate an action or change should occur when equaled and/or exceeded by a count, measurement, reading, etc. Thresholds may also be minimum values that indicate an action or change should occur when a count, measurement, reading, etc. is less than and/or equal to the threshold.

To encompass different ways that thresholds may be implemented in various embodiments, the phrase "satisfy a threshold" is used to refer to values, conditions or states in which a stated action or determination should be made by a processing device based on a threshold. For example, if a threshold is a maximum value, such a threshold may be "satisfied" when the corresponding count, measurement, reading, etc. equals and/or exceeds that maximum value. As another example, if a threshold is a minimum value, such a threshold may be "satisfied" when the corresponding count, measurement, reading, etc. is less than and/or equal to that minimum value. As a further example, if a threshold is a state or condition, such a threshold may be "satisfied" when that state or condition occurs or is attained.

The term "system-on-a-chip" (SoC) is used herein to refer to a single integrated circuit (IC) chip that contains multiple resources and/or processors integrated on a single substrate. A single SoC may include circuitry for digital, analog, mixed-signal, and radio-frequency functions. A single SoC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SoCs may also include software for controlling the integrated resources and processors, as well as for controlling peripheral devices. The host controller may form a portion of the SoC, and the UFS device may form a portion of the SoC.

The term "system-in-a-package" (SIP) may be used herein to refer to a single module or package that contains multiple resources, computational units, cores, and/or processors on two or more IC chips, substrates, or SoCs. For example, an SIP may include a single substrate on which multiple IC chips or semiconductor dies are stacked vertically. Similarly, the SIP may include one or more multi-chip modules (MCMs) on which multiple ICs or semiconductor dies are packaged into a unifying substrate. A SIP may also include multiple independent SoCs coupled together via high-speed communication circuitry and packaged in close proximity, such as on a single motherboard or in a single computing device. The proximity of the SoCs facilitates high-speed communications and the sharing of memory and resources.

As used herein, the term "processing system" refers to one or more processors, including multi-core processors, that are organized and configured to perform various computing functions. Various embodiments may be implemented in one or more of multiple processors within a UFS memory device or memory device controller as described herein. The terms "UFS," "Universal Flash Storage," and "flash storage device" are used interchangeably herein.

FIG. 1 is a system block diagram illustrating an example system 100 suitable for implementing any of the various embodiments. The system 100 may include one or more computing devices or processors connected to a GPU 130 via a system interface 120. The system interface 120 may be a system bus or a common interconnect on an SoC. The GPU 130 may be connected to a memory device 110 via the system interface 120. Since the system interface 120 may be shared by many other components of the SoC, as described in FIG. 2, the system interface 120 may become congested and constrain the output of the GPU 130. In this case, the GPU may compute an instruction and be unable to offload the result, which may require the GPU to re-compute the result when the result can be offloaded. In the same manner, the memory device 110 may be shared among various devices of the SoC or computing device and may become congested or overloaded with read or write requests.

The traffic monitor 140 may measure various metrics that define congestion and performance of the system interface 120 and the memory device 110. The traffic monitor module 140 may measure the latency of read or write instructions and other memory performance metrics of the memory device 110. To assess the system interface 120, the traffic monitor module 140 may connect to the system interface 120 to monitor bandwidth availability, bandwidth usage, bandwidth allocation, and other throughput metrics of the interface. The traffic monitor module 140 may receive these metrics from the system interface 120, which may be configured to measure memory metrics of the memory device 110. The traffic monitor module 140 may receive GPU performance metrics from the GPU, including an ALU utilization percentage, a clock rate, and a performance or operating set point.

The traffic monitor module 140 may evaluate metrics from various sources to manage GPU performance, including analyzing available bandwidth and workload characteristics to compute a corresponding set point. The traffic monitor module 140 may include three main modules: a bandwidth monitor 141, a workload analyzer 142, and a GPU controller 144. These modules may be implemented as hardware or software or a combination thereof. These modules may be implemented as part of the system interface 120 or GPU 130 or as a standalone component or as a combination thereof.

The bandwidth monitor 141 may include a processor and memory or access to memory, with the processor configured via firmware and/or in circuitry to record or measure various performance metrics associated with the system interface 120 and memory device 110 and determine a composite metric of memory performance. Such metrics may include cache misses, memory latency (read or write), available bandwidth (e.g., max memory read rate minus current read rate), allocated bandwidth (i.e., to the GPU), and other metrics. The bandwidth monitor 141 may calculate the available additional memory bandwidth by subtracting the current memory read bandwidth from the maximum memory read bandwidth.

The bandwidth monitor 141 may connect to a last level cache (LLC) performance monitoring unit (PMU) to sample the read bandwidth on the memory (LLC back-end) periodically. The bandwidth monitor 141 may connect to a PMU that monitors dropped packets and other network or communication metrics associated with the interface (e.g., NOC PMU). An NOC PMU may include hardware counters to track/monitor metrics for system bus-memory interface transactions. GPU PMU counters may track metrics local to GPU (ALU utilization, memory latency, bandwidth).

The composite metric defined by the bandwidth monitor 141 may include average memory latency cycles, GPU read bandwidth, available system bandwidth, and GPU ALU utilization. These metrics may be accessible through hardware performance counters and may be analyzed to determine whether the memory device or GPU device is in a memory streaming state, allowing for dynamic adjustments to performance parameters.

A workload analyzer 142 may include a processor configured via firmware and/or in circuitry to receive information related to the instructions being executed on the GPU, the nature of the calculations being performed on the GPU, or various system demands of the GPU. For example, the workload analyzer 142 may receive GPU metrics from a GPU PMU, such as the average memory latency cycles, the total read bytes per second, and the ALU working percentage. These metrics may be analyzed by a processor of the workload analyzer 142 to determine the constrained aspects of the workload and the type of workload (e.g., video vector calculation for image rendering or AI/ML large-language model training). For example, the workload analyzer 142 may determine whether a workload is ALU bound, bandwidth bound, or memory bound. The workload analyzer 142 may determine a composite stall ratio to determine the memory streaming nature of the workload.

The GPU controller 144 may include a processor configured via firmware and/or in circuitry to evaluate the metrics and information from the bandwidth monitor 141 and the workload analyzer 142, and may calculate and implement adjustments to the current operating point based on the additional bandwidth available and the workload characteristic. The GPU 130 may support Dynamic Clock and Voltage Scaling (DCVS) for fast switching between operating points, which may be controlled by the GPU controller 144. The adjustment to the current operating point of the GPU 130 by the GPU controller 144 may be an adjustment to GPU clock speed, ALU allocation, GPU voltage, or other GPU operating set point.

While the bandwidth monitor 141, workload analyzer 142, and GPU controller 144 are described as separate processing modules within the traffic monitor module 140, this is only for ease of description and is not intended to be limiting unless recited in the claims. In some embodiments, the functionality of these modules may be implemented in a single processor within the traffic monitor module 140 that is connected to the system interface 120 and GPU 130 as well as other system components. In some embodiments, the traffic monitor module 140 and the functionality of these modules may be implemented in another processor or subsystem of the computing device, such as in a CPU as part of the operating system or in a systems management processor as part of SoC overhead processes.

Figure 2:
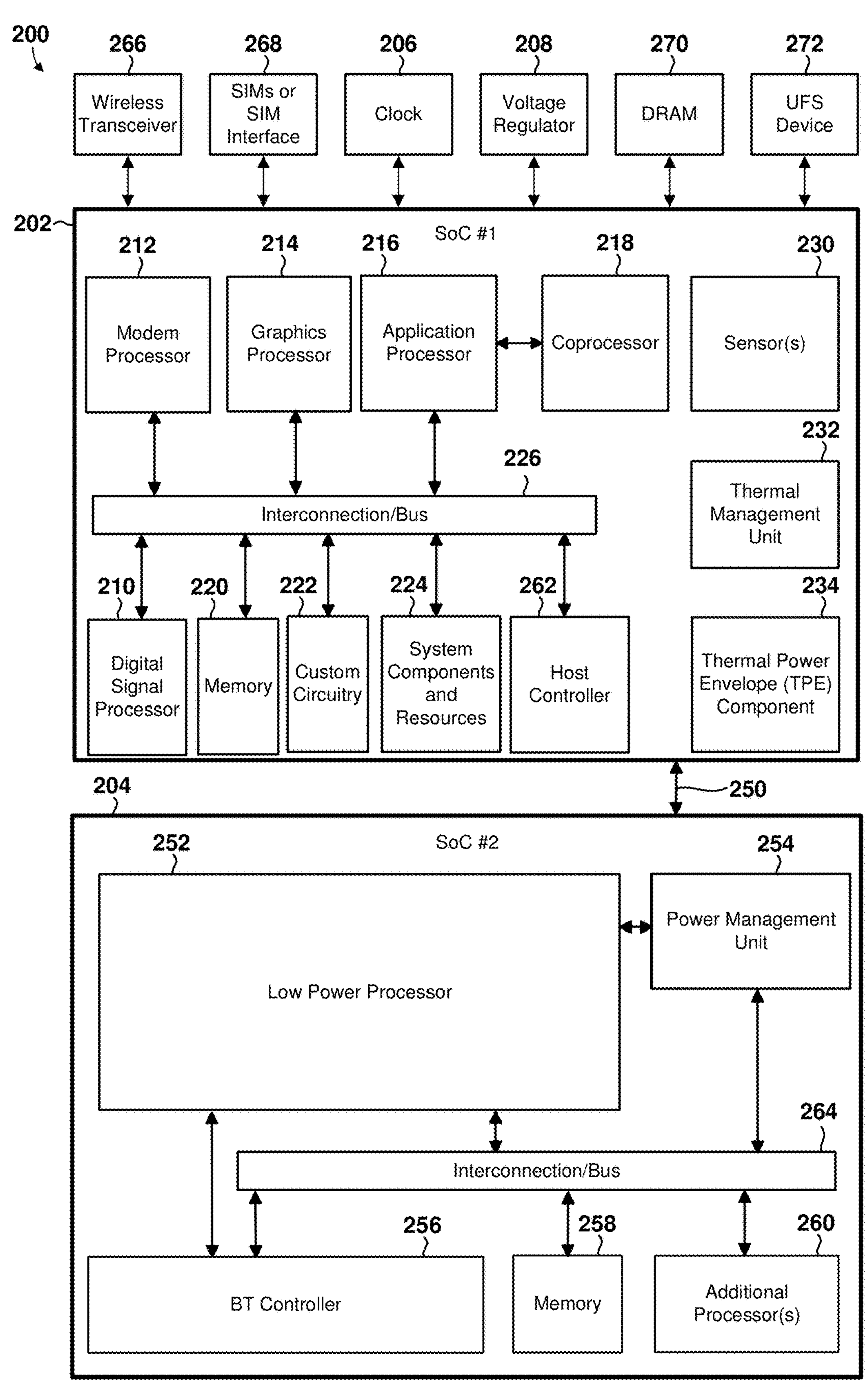
FIG. 2 is a system block diagram illustrating an example computing system suitable for implementing any of the various embodiments.

FIG. 2 is a component block diagram illustrating an example computing device 200 suitable for implementing any of the various embodiments. Various embodiments may be implemented on a number of single-processor and multiprocessor computer systems, including a system-on-chip (SoC) or a system in a package (SIP).

With reference to FIGS. 1-2, the illustrated example computing device 200 (which may be a system-in-a-package in some embodiments) includes two SoCs 202, 204 coupled to a clock 206, a voltage regulator 208, at least one subscriber identity module (SIM) 268 and/or a SIM interface, a dynamic random access memory (DRAM) 270, a UFS device 272 for storage, a wireless transceiver 266 configured to send and receive wireless communications via an antenna (not shown) to/from wireless computing devices, such as a base station, wireless device, and/or computing device (e.g., system 100). In some embodiments, the first SoC 202 may operate as the central processing unit (CPU) of the computing device 300 that carries out the instructions of software application programs by performing the arithmetic, logical, control, and input/output (I/O) operations specified by the instructions. The second SoC 204 may operate as a specialized processing unit in some embodiments. For example, the second SoC 204 may operate as a specialized 5G processing unit responsible for managing high volume, high speed (e.g., 5 Gbps, etc.), and/or very high-frequency short wavelength (e.g., 28 GHz mmWave spectrum, etc.) communications.

The first SoC 202 may include a digital signal processor (DSP) 210, a modem processor 212, a graphics processor 214 (e.g., GPU 130), an application processor (AP) 216, one or more coprocessors 218 (e.g., vector co-processor) connected to one or more of the processors (e.g., 212, 214, 216), memory 220, custom circuitry 222, system components and resources 224, a host controller 262, an interconnection/bus module 226 (e.g., system interface 120), one or more sensors 230 (e.g., accelerometer, temperature sensor, pressure sensor, optical sensor, infrared sensor, analog sound sensor, etc.), a thermal management unit 232, and a thermal power envelope (TPE) component 234. The second SoC 204 may include a low-power processor 252, a power management unit 254, an interconnection/bus module 264, a BT controller 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SoC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SoC 202, 204 may include various system components, resources, and custom circuitry for managing sensor data, analog-to-digital conversions, wireless data transmissions, and for performing other specialized operations, such as decoding data packets and processing encoded audio and video signals for rendering in a web browser or audio/video application. For example, the system components and resources 224 of the first SoC 302 may include power amplifiers, voltage regulators, oscillators, phase-locked loops, peripheral bridges, data controllers, memory controllers, system controllers, access ports, timers, and other similar components used to support the processors and software clients running on a computing device. The system components and resources 224 and/or custom circuitry 222 may also include circuitry to interface with peripheral devices, such as cameras, electronic displays, wireless communication devices, external memory chips, etc.

The first and second SoC 202, 204 may communicate via interconnection/bus module 250. In some embodiments, the interconnection/bus module 250 may be a connection established by transceiving (i.e., receiving and transmitting) components within both the SoC 202 and SoC 204. For example, the low-power processor 252 may include a universal asynchronous receiver-transmitter (UART), and the application processor 316 may include a multiple signal messages (MSM) UART driver that is communicatively connected to the UART of the low-power processor 252.

The various processors 210, 212, 214, 216, 218 may be interconnected to one or more memory elements 220, system components and resources 224, custom circuitry 222, and a thermal management unit 232 via an interconnection/bus module 226. Similarly, the low-power processor 252 may be interconnected to the power management unit 254, the BT controller 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on-chip (NoCs).

In various embodiments, any or all of the processors 210, 212, 214, 216, and 218 in the system may operate as the SoC's main processor, central processing unit (CPU), microprocessor unit (MPU), arithmetic logic unit (ALU), etc. One or more of the coprocessors 218 may operate as the CPU. In addition to the example system 100 discussed above, various embodiments may be implemented in various computing systems, including a single processor, multiple processors, multicore processors, or any combination thereof.

The first and/or second SoCs 202, 204 may further include an input/output module (not illustrated) for communicating with resources external to the SoC, such as a clock 206, a voltage regulator 208, one or more wireless transceivers 266, and at least one SIM 268 and/or SIM interface (i.e., an interface for receiving one or more SIM cards). Resources external to the SoC (e.g., clock 206, voltage regulator 208) may be shared by two or more of the internal SoC processors/cores. At least one SIM 268 (or one or more SIM cards coupled to one or more SIM interfaces) may store information supporting multiple subscriptions, including a first 5GNR subscription and a second 5GNR subscription.

In addition to the example computing device 200 discussed above, various embodiments may be implemented in a wide variety of computing systems, which may include a single processor, multiple processors, multicore processors, or any combination thereof.

In some embodiments, the various processors of the SoC 202 and SoC 204 may be located within the same SoC. For example, the application processor 216 and low-power processor 252 may be located within the same SoC, such as in a single SoC of a wearable device, to perform optimized storage routines with the UFS device 272.

Figure 3:
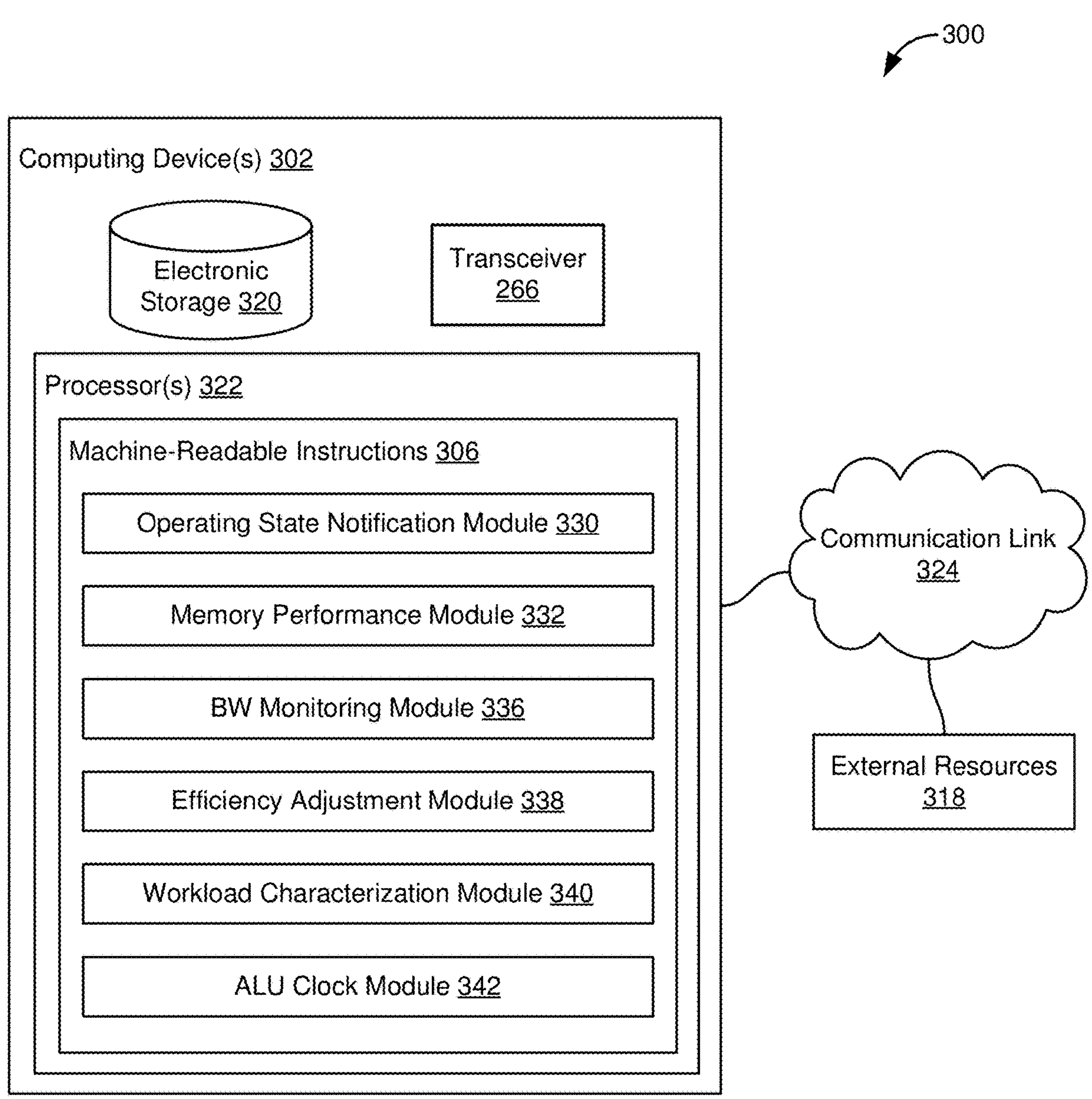
FIG. 3 is a component block diagram illustrating an example computing device suitable for implementing any of the various embodiments.

FIG. 3 is a component block diagram illustrating an example system 300 configured for controlling the GPU according to some embodiments. With reference to FIGS. 1-3, the system 300 may include a computing device 302 and external resources 318, which may communicate via a communication link 324 (e.g., system interface 120). External resources 318 may be a processing system of a computing device that may transmit processing tasks or operations to the computing device 302. The system 300 may include a plurality of hardware, software, and/or firmware components operating together to provide the functionality attributed to the processor(s) 322 (e.g., traffic monitor 140). The computing device 302 may include a transceiver 266, which may be an interconnect or other networking component of the computing device 302. The electronic storage 320 may include one or more caches on the GPU or a shared SoC memory (e.g., double data rate random access memory—DDR RAM).

The computing device 302 may include electronic storage 320 that may be configured to store information as instructed by the processor 322 via machine-readable instructions 306. The electronic storage 320 may include FLASH-type non-transitory storage media (e.g., read-only memory) that electronically stores information. The electronic storage 320 may store software algorithms, information determined by processor(s) 322 of a processing system, and/or other information that enables the device 302 to function as described herein.

The computing device processor(s) 322 may be configured by machine-readable instructions 306. Machine-readable instructions 306 may include one or more instruction modules. The instruction modules may include computer program modules. The instruction modules may include one or more of an operating state notification module 330, a memory performance module 332, a bandwidth (BW) monitoring module 336, an efficiency adjustment module 338, a workload characterization module 340, an ALU clock module 342, and other instruction modules (not illustrated). The computing device 302 may include one or more processor(s) 322 of a processing system configured to implement the machine-readable instructions 306 and corresponding modules.

In some embodiments, the processor(s) 322 executing the operating state notification module 330 may be configured to report an operating state or operating set point. For example, operating state notification module 330 may connect to the electronic storage 320 (e.g., memory device 110) and may indicate that it is capable of memory streaming or how much memory has been allocated to the GPU (e.g., GPU 130). The operating state notification module 330 may connect to the GPU 130 and indicate the GPU's operating state, including voltage and clock set points. The operating state notification module 330 may connect to the transceiver 266 or other interface (e.g., system interface 120) and may indicate the operating state of the connection, including available bandwidth, allocated bandwidth, and other set points.

In some embodiments, the processor(s) 322 executing the memory performance module 332 may record and monitor latency, missed cache queries, and other memory operating metrics. In other words, the memory performance module 332 may monitor memory operations, including operations from other devices on the computing device 302. Some aspects of the memory performance may be monitored from the system interface connected to the memory as a part of the operations of the memory performance module 332.

In some embodiments, the processor(s) 322 executing the BW monitoring module 336 may be configured to measure the balance between the GPU's memory subsystem (e.g., memory device 110) and its arithmetic logic units (ALUs). The BW monitor module 336 may connect to the memory performance module 332 and the operating state module 330 to receive metrics associated with the various components of the computing device 302. The BW monitor module 336 may connect to the system interface (between the processors 322 and electronic storage 320) (e.g., system interface 120) to detect and monitor the current bandwidth metrics and usage across the system interface, including the usage from other devices.

The BW monitor module 336 may determine a bandwidth parameter, which may be composed of three terms that depend on the average memory latency, the memory read bandwidth, and the ALU utilization of the GPU. The bandwidth monitor module 336 may be executed by a processor (e.g., 322) or hardware logic that connects to the performance counters of the GPU and the system interface. The system interface may be the shared interface that connects the GPU to the memory device and other components on the computing device (e.g., SoC). The performance may be measured by the number of instructions retired by the GPU, which may be compared to a threshold. If the performance does not satisfy (e.g., is less than) the threshold, the GPU reverts to its previous operating point. If the performance satisfies (e.g., meets or exceeds) the threshold, the GPU continues to monitor the bandwidth monitor and lower its operating point if possible.

In some embodiments, the processor(s) 322 executing the efficiency adjustment module 338 may dynamically determine set points for the GPU that avoid wasted clock cycles and under-utilization of ALUs. The efficiency adjustment module 338 may be configured to receive bandwidth metrics, including the bandwidth parameter from the BW monitor module 336. The efficiency adjustment module 338 may inform the GPU's dynamic voltage and frequency scaling (DVFS) mechanism to adjust the GPU's operating point (voltage, power, and clock) based on the type of operations (e.g., gaming, graphics rendering, virtual reality, AI/ML, etc.) and intensity of the workload executing on the GPU and the bandwidth parameter. The efficiency adjustment module 338 may balance the constraints of the external resources and the GPU to operate the GPU at the most power-efficient point without losing performance. The efficiency adjustment module 338 may monitor the performance of the GPU after an adjustment to the operating set point to ensure that performance is not impacted more than a threshold amount, and if performance is impacted by or more than the threshold amount, the efficiency adjustment module 338 may operate to reset or select a new set point for the GPU.

In some embodiments, the processor(s) 322 executing the workload characterization module 340 may be configured to monitor the types of instructions, the GPU subsystems being used, and other aspects of the GPU processing to determine a workload based on a type of operations executing on the GPU (e.g., gaming, graphics rendering, virtual reality, AI/ML, etc.). Certain workload types may have specific constraints that can be predicted or adapted to by the efficiency adjustment module 338. For example, video game processing or bitcoin mining may involve many mathematical computations being performed at the ALUs, representing a heavy workload by the GPU, whereas the training and/or inference of a large language model (LLM) may involve more data and memory usage, representing a lighter workload by the GPU. The workload characterization module 340 may be configured to determine the types of one or more operations being executed on the GPU and associated workloads, and assess or predict various system constraints based on those workload types. The workload characterization module 340 may connect to the efficiency adjustment module 338 to inform it of constraints and workload associated with the type of operations executing on the GPU so that the efficiency adjustment module 338 may determine the appropriate balance of resource usage (e.g., operating set points).

For example, the workload characterization module 338 may calculate an arithmetic intensity that is the ratio of total operations (Ops) to total data movement (bytes). A GPU workload for a Large Language Model inference involves streaming large amounts of data, but the arithmetic intensity of the workload during inference is below ten ops/byte. The GPU may process up to 48 ops/byte (3072GFLOPS, 65 GBPS bandwidth). Thus, a workload with an arithmetic intensity of less than 48 may benefit from higher performance or lower power usage by applying the dynamic GPU core clock management based on memory interface feedback, as described herein.

In some embodiments, the processor(s) 322 executing the ALU clock module 342 may be configured to adjust ALU clock rates. The ALU clock module 342 may be a part of the GPU's dynamic voltage and frequency scaling (DVFS) mechanism. The ALU clock module 342 may receive instructions from the efficiency adjustment module 338 to change an operating set point of the ALUs of the GPU. The ALU clock module 342 may communicate an operating set point to the operating state notification module 330, including an ALU utilization percentage.

In an example implementation, an LLM inference workload may be executed on the GPU of the computing device 302. The LLM inference executing on the GPU may concentrate on decode performance. Decode performance may be limited by memory bandwidth (e.g., to 62 GBPS), with non-linear scaling observed from 1000 Mhz to 629 Mhz. Since LLM inference may be predominantly decode operations, and since decode operations are memory bound by the bandwidth, LLM inference may be bound by memory bandwidth constraints. In this example, decode operations may be executed with 80% higher performance per Watt (Tok/W) for about a 7.5% performance penalty.

In an example implementation, a memory streaming benchmark may be executed on the GPU. The computing device 302, in this example, may experience a 1.7% higher memory latency at 63% of peak GPU core clock. GPU workloads running memory streaming may have memory latency saturation or be the constraint at higher core clocks. Likewise, in this example, the computing device may experience a 2.7% lower memory bandwidth for 63% of the peak GPU core clock. GPU workloads running memory streaming may have memory bandwidth saturation or be the constraint at higher core clocks.

The description of the functionality provided by the different modules 330-342 is for illustrative purposes and is not intended to be limiting, as any of modules 330-342 may provide more or less functionality than is described. For example, one or more of modules 330-342 may be eliminated, and some or all of its functionality may be provided by other ones of modules 330-342. As another example, processor(s) 322 may execute one or more additional modules that may perform some or all of the functionality attributed below to one of the modules 330-342.

Figure 4:
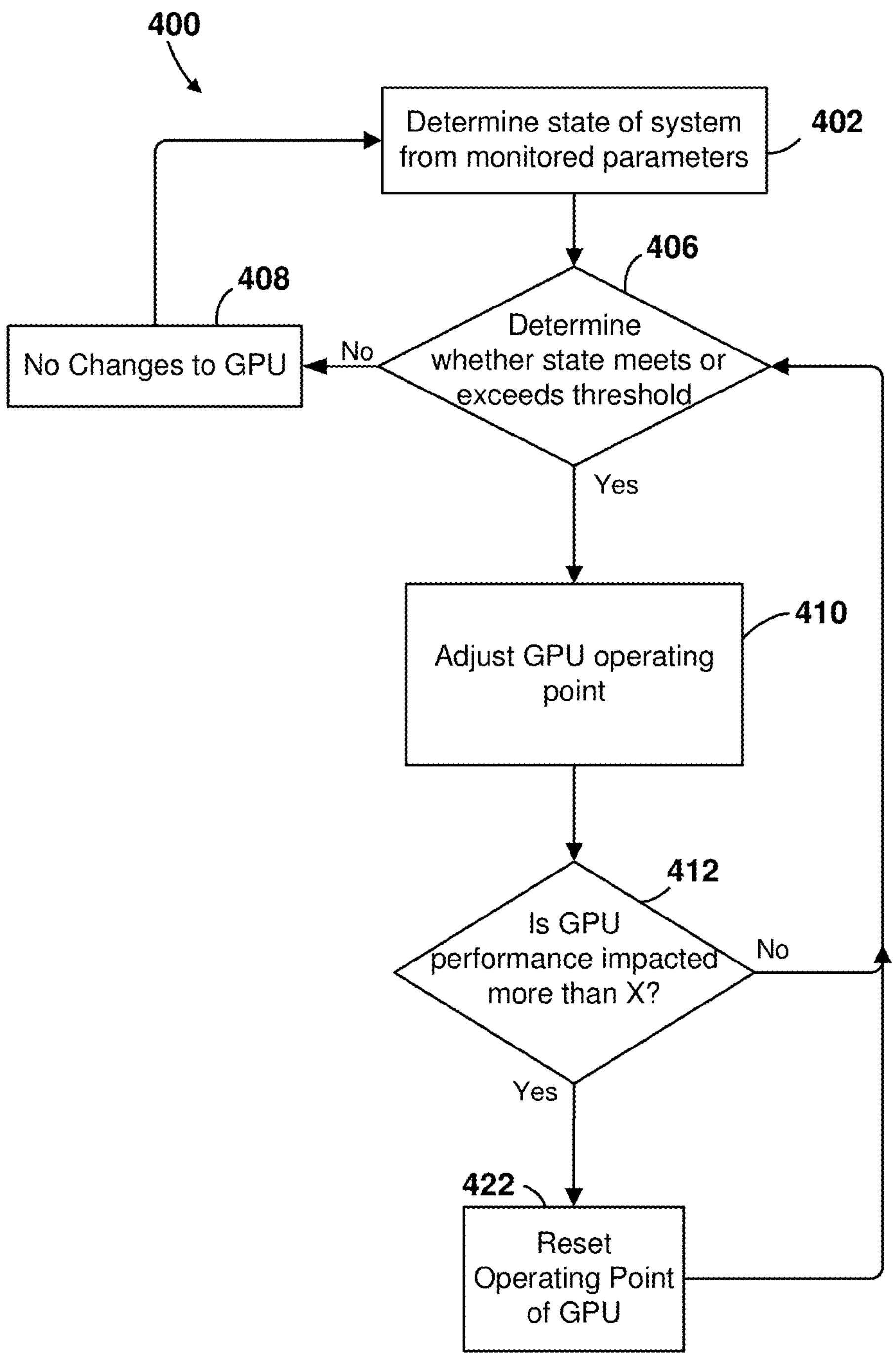
FIG. 4 is a process block diagram illustrating an example method for controlling a GPU according to various embodiments.

FIG. 4 illustrates an example method 400 for managing a processing core using the example of a graphical processing unit (GPU) according to some embodiments. With reference to FIGS. 1-4, the method 400 may be implemented in a GPU (e.g., 130, 214), in interface hardware (e.g., 120, 226), in software executing in a processor (e.g., 306), or in a combination of a software-configured processor and dedicated hardware that includes other individual components. Means for performing functions of the method 400 may include a processor (e.g., 332) coupled to memory (e.g., 110, 320). In order to encompass the alternative configurations enabled in various embodiments, the hardware implementing the method 400 is referred to herein as the processor or computing device In block 402, the processor or computing device may determine the state of the system from monitored parameters, including set parameters such as allocated bandwidth, memory streaming capability, GPU clock speed, and other configurations, as well as detected parameters, such as memory latency, workload associated with the type of operations executing on the computing device (e.g., gaming, graphics rendering, virtual reality, AI/ML, etc.), and bandwidth availability. The state of the system may be continuously, periodically, or intermittently detected and determined in block 402.

In determination block 406, the processor or computing device may determine whether the detected state satisfies (e.g., meets or exceeds) a threshold. For example, the detected parameters may be combined in an equation or formula to generate an overall parameter for the system, such as a bandwidth parameter. In some embodiments, the bandwidth parameter (BW) may be defined by:

$$BW = \alpha(X/XT) + \beta(R/Ra) + \Gamma(UT/U),$$

in which α, β, and Γ are scaling parameters, X is an average memory latency, XT is a threshold memory latency, R is a GPU read operation bandwidth, Ra is an available GPU read operation bandwidth, UT is an ALU utilization threshold, and U is a measure of ALU utilization. This BW may correspond to a constraint level present in the GPU's memory interface. BW may be compared to one or more thresholds to determine whether the bandwidth performance constrains the GPU.

If the processor determines that the performance or operating state does not satisfy (e.g., meets or exceeds) the threshold (i.e., determination block 406=NO), the processor or the computing device may make no changes to the GPU operations in block 408. The processor may return to monitoring in block 402 and perform the determination in block 406 as described.

If the processor determines that the performance or operating state satisfies (e.g., meets or exceeds) a threshold (i.e., determination block 406=YES), the processor or the computing device may adjust a GPU operating point such as an ALU clock speed in block 410. For example, if the state of the system indicates that the GPU is bandwidth constrained by or more than the threshold amount, the processor may reduce the clock speed of the GPU to conserve power while maintaining performance at the bandwidth constrained level.

In determination block 412, after adjusting the GPU operating point, the processor or computing device may determine whether the performance of the GPU has been impacted more than a predetermined amount (e.g., by or more than a threshold amount). For example, the processor may be configured to compare the GPU operating performance using the metric of instructions retired (successfully executed) to determine how performance is impacted.

If the number of instructions retired in a given unit time is not reduced by or more than the threshold amount after changing the operating point (i.e., determination block 412=NO), the processor or the computing device may again perform the operations in determination block 406 to determine whether further changes to the operating point are needed.

If the processor determines that the GPU performance was impacted by more than a given amount (X) (i.e., determination block 412=YES), the processor or the computing device may reset the operating point of the GPU in block 422. In some embodiments, the processor or the computing device may reset the operating point of the GPU to the operating point prior to the change made in block 410. In some embodiments, the reset performed in block 422 may be a predetermined increase in the operating point of the GPU. After resetting the operation point in block 422, the processor or the computing device may again perform the operations in determination block 406 to determine whether further changes to the operating point are needed as described.

Figure 5:
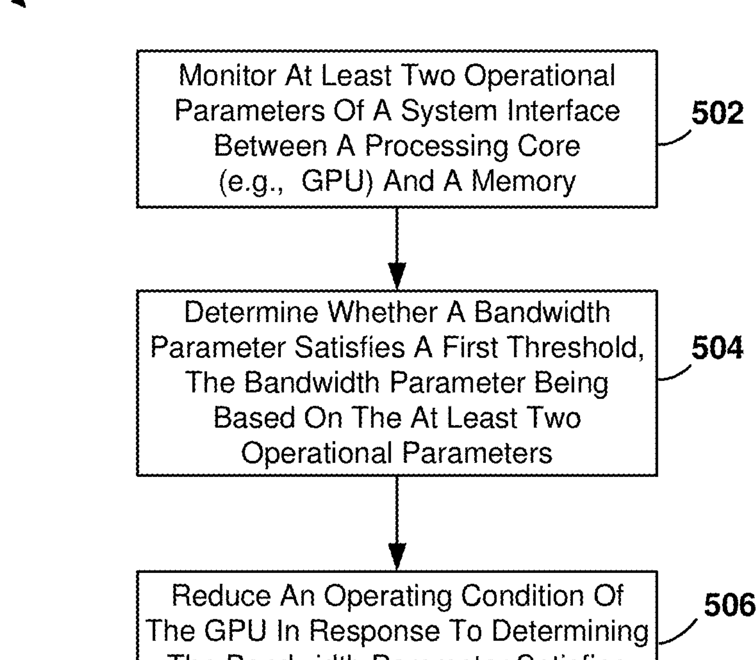
FIG. 5 is a process flow diagram of an example method for GPU management in accordance with various embodiments.

FIG. 5 illustrates an example method 500 for managing a (e.g., gaming, graphics rendering, virtual reality, AI/ML, etc.) using the example of a GPU according to some embodiments. With reference to FIGS. 1-5, the method 500 may be performed in a traffic monitor module 140, which may include a processor and circuitry, or may be implemented as part of a processing core, such as a GPU (e.g., 130, 214), in interface hardware (e.g., 120, 226), in software executing in a processor (e.g., 306), or in a combination of a software-configured processor and dedicated hardware that includes other individual components. Means for performing functions of the method 500 may include a processor (e.g., 332) coupled to memory (e.g., 110, 320). In order to encompass the alternative configurations enabled in various embodiments, the hardware implementing the method 500 is referred to herein as a "processor."

In block 502, the processor may perform operations, including monitoring at least two operational parameters of a system interface between the processing core (e.g., a GPU) and memory. For example, performance monitoring counters (PMCs) may be implemented in a GPU, the system interface or memory bus, and in memory to record various operating parameters. In some embodiments, the monitored execution performance is a rate of instructions retired from a register. In some embodiments, the at least two operational parameters may be one or more of an average memory latency of the memory, a GPU read bandwidth of the system interface, a bandwidth allocation, a bandwidth availability, an arithmetic logic unit (ALU) utilization of the GPU, and/or an ALU clock rate.

In block 504, the processor may perform operations, including determining whether a bandwidth parameter satisfies (e.g., meets or exceeds) a first threshold, the bandwidth parameter being based on the at least two operational parameters. In some embodiments, the bandwidth parameter satisfies the first threshold if the bandwidth parameter indicates the bandwidth is constrained. In some embodiments, the bandwidth parameter satisfies the first threshold if the bandwidth parameter indicates the memory is constrained. In some embodiments, the first threshold may vary based on the workload associated with the type of operations executing on the GPU. In some embodiments, the bandwidth parameter (BW) is defined by: BW=α(X/XT)+β(R/Ra)+Γ(UT/U), α, β, and Γ are scaling parameters, X is an average memory latency, XT is a threshold memory latency, R is a GPU read operation bandwidth, Ra is an available GPU read operation bandwidth, UT is an ALU utilization threshold, and U is a measure of ALU utilization. In some embodiments, the bandwidth parameter depends upon parameters that are determined based on a processing load associated with the type of operations being performed by the GPU.

The first threshold may be a numerical value, which may be associated with bandwidth, or unitless like the bandwidth parameter.

In block 506, the processor may perform operations including reducing an operating condition of the processing core (e.g., a GPU) in response to determining the bandwidth parameter satisfies the first threshold. For example, a GPU may be instructed to reduce the clock rate of its ALUs to conserve power. In some embodiments, the operating condition may be a frequency of clock signals provided to the processing core (e.g., a GPU). In some embodiments, reducing the operating condition of the processing core is performed by reducing the execution rate of the processing core by a predetermined number of executions per unit time.

Figure 6:
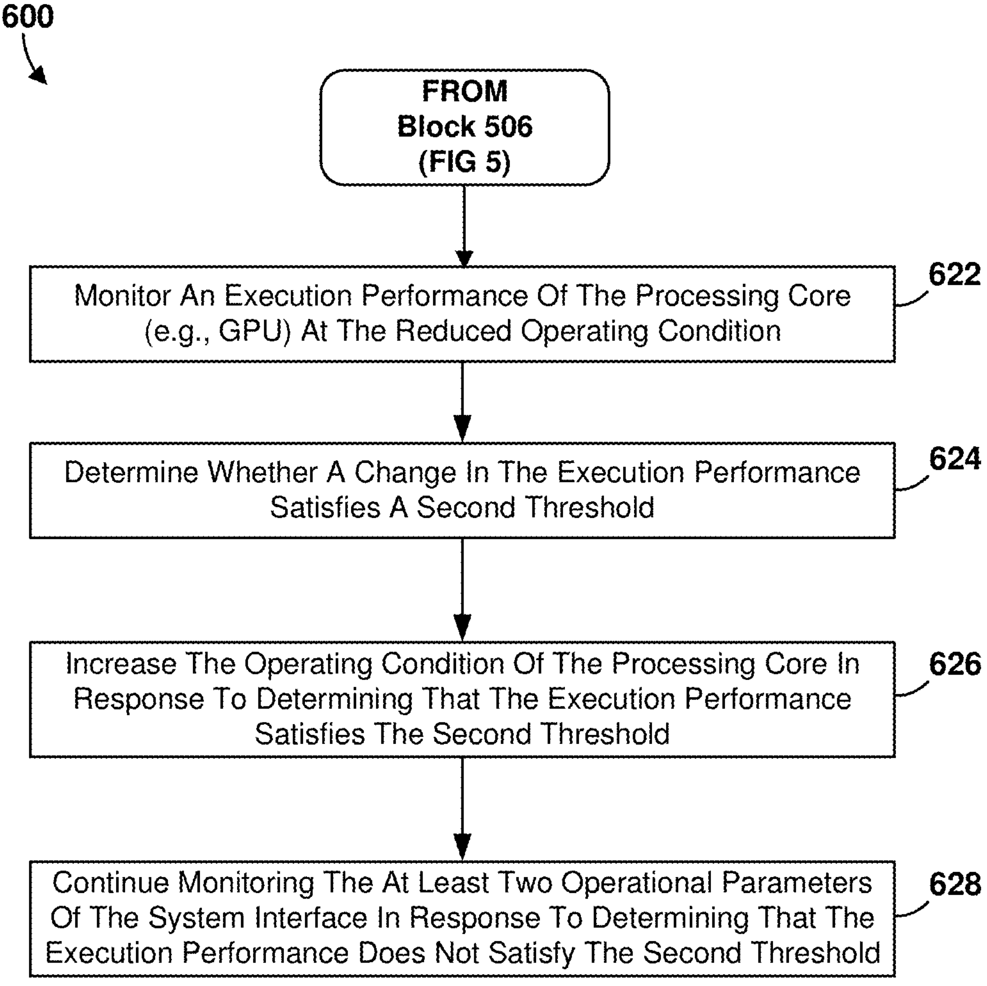
FIG. 6 is a process flow diagram of an example method for GPU management in accordance with various embodiments.

FIG. 6 illustrates an example method 600 for managing a processing core (e.g., a GPU) according to some embodiments. With reference to FIGS. 1-6, the method 600 may be implemented in a processing core (e.g., a GPU) (e.g., 130, 214), in interface hardware (e.g., 120, 226), in software executing in a processor (e.g., 306), or in a combination of a software-configured processor and dedicated hardware that includes other individual components. Means for performing functions of the method 600 may include a processor (e.g., 332) coupled to memory (e.g., 110, 320). In order to encompass the alternative configurations enabled in various embodiments, the hardware implementing the method 600 is referred to herein as a "processor." In general, the method 600 operates to ensure that the performance of the processing core does not excessively degrade after performing the method of FIG. 5.

Following the operations in block 506 of the method 500 (FIG. 5), the processor may monitor the execution performance of the processing core (e.g., a GPU) at the reduced operating condition in block 622. In some embodiments, the execution performance may be monitored by a processor-memory controller (PMC) that is configured to count retired instructions in a given unit of time. Retired instructions may be instructions that have been successfully read from memory and executed by the processing core (e.g., a GPU). The performance of the GPU may be measured by execution latency, queues, or backlogs.

In block 624, the processor may determine whether a change in the execution performance satisfies (e.g., meets or exceeds) a second threshold. For example, the second threshold may be a performance level in retired instructions per second that was present before the reduced operating condition was implemented. In some embodiments, the second threshold may be a performance level that is a given percentage (e.g., 5%, 10%, 15%) lower than the maximum corner or maximum performance of the GPU (e.g., maximum clock rate).

In response to determining that the execution performance satisfies the second threshold (e.g., meets or exceeds the threshold), the processor may increase the operating condition of the processing core (e.g., a GPU) in block 626. In some embodiments, the increase may reset the operating condition of the processing core (e.g., a GPU) to the operating condition before the change made in block 506. In some embodiments, the increase may be a predetermined increase in the operating point of the processing core (e.g., a GPU), which may be less than the amount reduced in block 506.

In block 628, the processor may continue monitoring the at least two operational parameters of the system interface in response to determining that the execution performance does not satisfy the second threshold. For example, if performance has not degraded as a result of the change, the processor may return to monitoring the bandwidth in block 502, which may result in further changes to the operating condition of the processing core (e.g., a GPU) as described with reference to FIG. 5.

Figure 7:
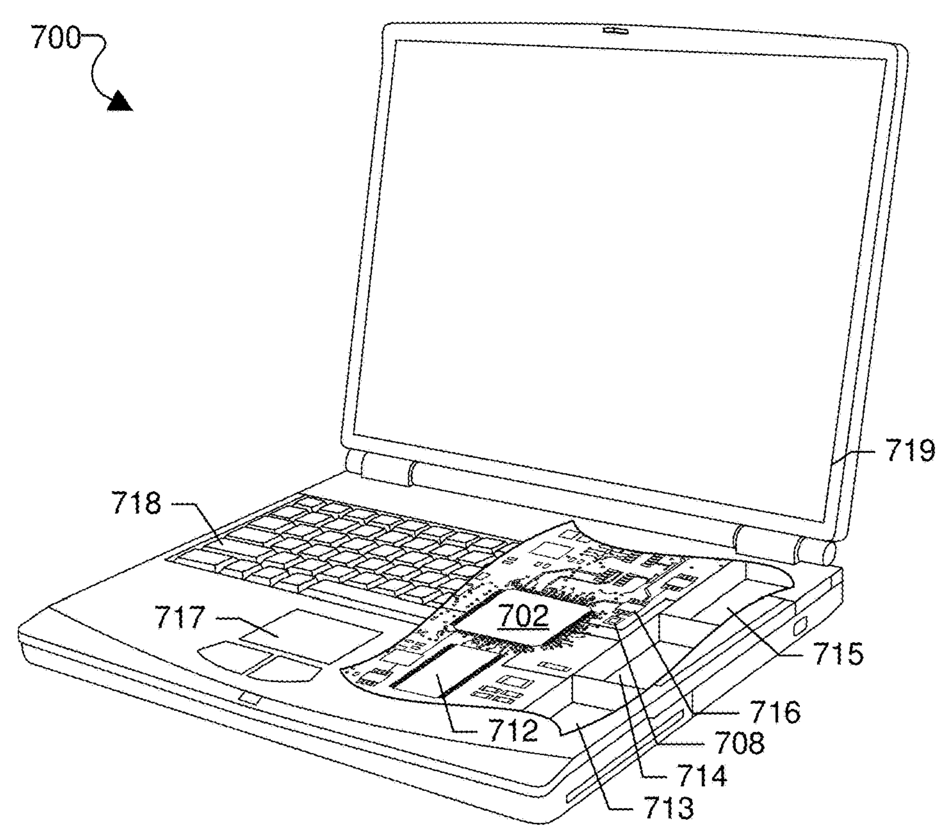
FIG. 7 is a component block diagram illustrating an example laptop suitable for use with various embodiments.

Various embodiments (including, but not limited to, embodiments described with reference to FIGS. 1-6) may be implemented in a wide variety of computing systems, which may include a laptop computer 700 (e.g., computing device 100, 200, 302), an example of which is illustrated in FIG. 7. With reference to FIGS. 1-7, a laptop computer may include a touchpad touch surface 717 that serves as the computer's pointing device, and thus may receive drag, scroll, and flick gestures similar to those implemented on computing devices equipped with a touch screen display and described above. A laptop computer 700 will typically include a processor 702 coupled to volatile memory 712 and a large capacity nonvolatile memory, such as a disk drive 713 of Flash memory. Additionally, the computer 700 may have one or more antenna 708 for sending and receiving electromagnetic radiation that may be connected to a wireless data link and/or cellular telephone transceiver 716 coupled to the processor 702. The computer 700 may also include a floppy disc drive 714 and a compact disc (CD) drive 715 coupled to the processor 702. The laptop computer 700 may include a touchpad 717, a keyboard 718, and a display 719 all coupled to the processor 702. Other configurations of the computing device may include a computer mouse or trackball coupled to the processor (e.g., via a universal serial bus (USB) input) as are well known, which may also be used in conjunction with the various embodiments.

Figure 8:
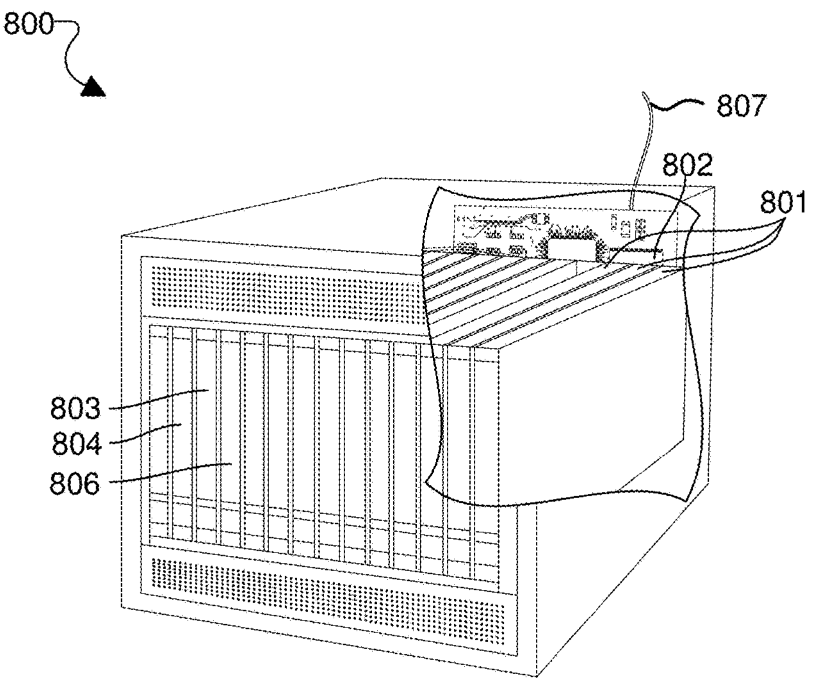
FIG. 8 is a component block diagram illustrating an example server suitable for use with various embodiments.

FIG. 8 is a depiction of a computing device 800, such as a server, suitable for use with various embodiments. Such computing devices may include at least the components illustrated in FIG. 8. With reference to FIGS. 1-8, the computing device 800 (e.g., computing device 100, 200, 302) may include a processor 801 coupled to volatile memory 802 and a large capacity nonvolatile memory, such as a disk drive 803.

The computing device 800 may also include a peripheral memory access device such as a floppy disc drive, compact disc (CD) or digital video disc (DVD) drive 806 coupled to the processor 801. The computing device 800 may also include network access ports 804 (or interfaces) coupled to the processor 801 for establishing data connections with a network, such as the Internet and/or a local area network coupled to other system computers and servers.

The computing device 800 may include one or more antennas 807 for sending and receiving electromagnetic radiation that may be connected to a wireless communication link. The computing device 800 may include additional access ports, such as USB, Firewire, Thunderbolt, and the like for coupling to peripherals, external memory, or other devices.

Figure 9:
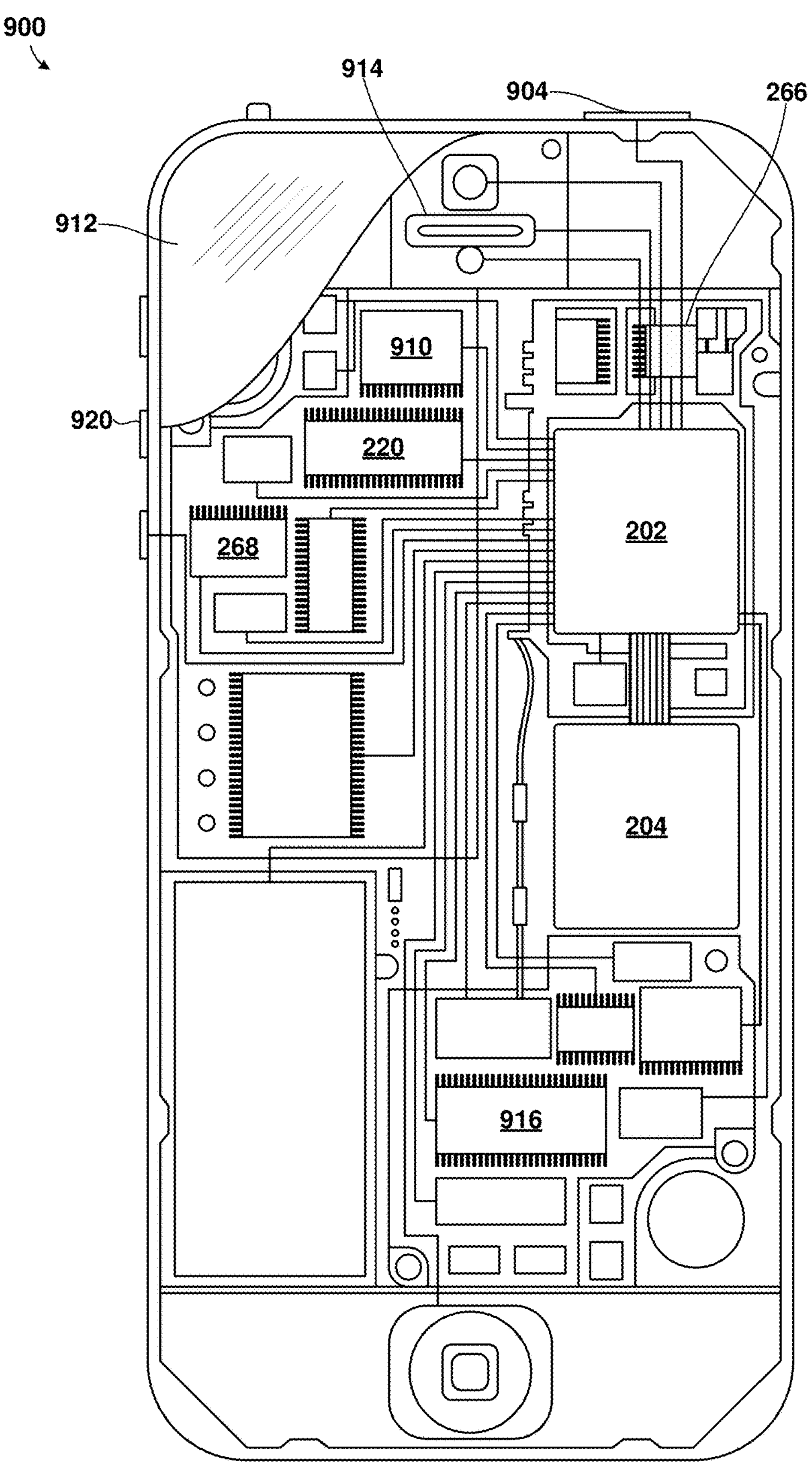
FIG. 9 is a component block diagram illustrating an example wireless communication device suitable for use with the various embodiments.

FIG. 9 is a component block diagram of a computing device 900 suitable for use with various embodiments. With reference to FIGS. 1-9, various embodiments may be implemented on a variety of computing devices 900 (e.g., computing device 100, 200, 302), an example of which is illustrated in FIG. 9 in the form of a smartphone. The computing device 900 may include a first SoC 202 (e.g., a SoC-CPU) coupled to a second SoC 204 (e.g., a 5G capable SoC). The first and second SoCs 202, 304 may be coupled to internal memory 916, a display 912, and to a speaker 914. The first and second SoCs 202, 204 may also be coupled to at least one SIM 268 and/or a SIM interface that may store information supporting a first 5GNR subscription and a second 5GNR subscription, which support service on a 5G non-standalone (NSA) network.

The computing device 900 may include an antenna 904 for sending and receiving electromagnetic radiation that may be connected to a wireless transceiver 266 coupled to one or more processors in the first and/or second SoCs 202, 204. The computing device 900 may also include menu selection buttons or rocker switches 920 for receiving user inputs.

The computing device 900 also includes a sound encoding/decoding (CODEC) circuit 910, which digitizes sound received from a microphone into data packets suitable for wireless transmission and decodes received sound data packets to generate analog signals that are provided to the speaker to generate sound. Also, one or more of the processors in the first and second SoCs 202, 204, wireless transceiver 266 and CODEC 910 may include a digital signal processor (DSP) circuit (not shown separately).

The processors of the computer 700, the computing device 800, and the computing device 900 may be any programmable microprocessor, microcomputer or multiple-processor chip or chips that can be configured by software instructions (applications) to perform a variety of functions, including the functions of the various embodiments described below. In some mobile devices, multiple processors may be provided, such as one processor within an SoC 204 dedicated to wireless communication functions and one processor within an SoC 202 dedicated to running other applications. Software applications may be stored in memory 320, 916 before they are accessed and loaded into the processor. The processors may include internal memory sufficient to store the application software instructions.

Implementation examples are described in the following paragraphs. The following implementation example methods may be performed in a computing device that includes a processor configured to perform the methods of the following implementation examples. The following implementation example methods may be performed in a traffic monitor module processing device of a computing device. The following example methods may be implemented in a non-transitory, processor-readable memory having stored thereon processor-executable instructions configured to cause a processor of a computing device to perform the method operations.

Example 1. A method for managing a processing core (e.g., a GPU), including: monitoring at least two operational parameters of a system interface between the processing core and a memory; determining whether a bandwidth parameter satisfies a first threshold, the bandwidth parameter being based on the at least two operational parameters; and reducing an operating condition of the processing core in response to determining the bandwidth parameter satisfies the first threshold.

Example 2. The method of example 1, further including: monitoring an execution performance of the processing core at the reduced operating condition; determining whether a change in the execution performance satisfies a second threshold; increasing the operating condition of the processing core in response to determining that the execution performance satisfies the second threshold; and continue monitoring the at least two operational parameters of the system interface in response to determining that the execution performance does not satisfy the second threshold.

Example 3. The method of example 2, in which the monitored execution performance is a rate of instructions retired from a register.

Example 4. The method of any of examples 1-3, in which the at least two operational parameters are two of: an average memory latency of the memory; a processing core read bandwidth of the system interface; or an arithmetic logic unit (ALU) utilization of the processing core.

Example 5. The method of any of examples 1-4, in which the operating condition is a frequency of clock signals provided to the processing core.

Example 6. The method of any of examples 1-5, in which reducing the operating condition of the processing core includes: reducing an execution rate of the processing core by a predetermined number of executions per unit time.

Example 7. The method of any of examples 1-6, in which the bandwidth parameter depends upon parameters determined based on a processing load associated with a type of operations being performed by the processing core.

Example 8. The method of any of examples 1-7, in which the processing core is a GPU.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process-related communication methodologies.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods may be substituted for or combined with one or more operations of the methods.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an," or "the" is not to be construed as limiting the element to the singular.

The various illustrative logical blocks, modules, circuits, and algorithm operations described in connection with the embodiments may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the claims.

The hardware used to implement the various illustrative logics, logical blocks, modules, and circuits described in connection with the embodiments may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable medium or non-transitory processor-readable medium. The operations of a method or algorithm disclosed herein may be embodied in a processor-executable software module, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes magnetic disk storage that stores and reproduces data magnetically, and compact disc (CD), laser disc, optical disc, digital versatile disc (DVD), floppy disc, and Blu-ray disc in which discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method for managing a processing core, comprising:

monitoring at least two operational parameters of a system interface between the processing core and a memory;

determining whether a bandwidth parameter satisfies a first threshold, the bandwidth parameter being based on the at least two operational parameters, and the first threshold being based on a type of operations being performed by the processing core; and reducing an operating condition of the processing core in response to determining the bandwidth parameter satisfies the first threshold.

2. The method of claim 1, further comprising:

monitoring an execution performance of the processing core at the reduced operating condition;

determining whether a change in the execution performance satisfies a second threshold;

increasing the operating condition of the processing core in response to determining that the execution performance satisfies the second threshold; and continuing monitoring the at least two operational parameters of the system interface in response to determining that the execution performance does not satisfy the second threshold.

3. The method of claim 2, wherein the monitored execution performance is a rate of instructions retired from a register.

4. The method of claim 1, wherein the at least two operational parameters are two of:

an average memory latency of the memory;

a processing core read bandwidth of the system interface; or an arithmetic logic unit (ALU) utilization of the processing core.

5. The method of claim 1, wherein the operating condition is a frequency of clock signals provided to the processing core.

6. The method of claim 1, wherein reducing the operating condition of the processing core comprises:

reducing an execution rate of the processing core by a predetermined number of executions per unit time.

7. The method of claim 1, wherein the processing core is a graphical processing unit (GPU) and the bandwidth parameter depends upon parameters determined based on a processing load associated with a type of operations being performed by the GPU.

8. A computing device, comprising:

a memory;

a processing core;

a system interface coupled to the memory and the processing core; and a traffic monitor module coupled to the system interface, the memory, and the GPU, wherein the traffic monitor module is configured to:

monitor at least two operational parameters of the system interface between the processing core and the memory;

determine whether a bandwidth parameter satisfies a first threshold, the bandwidth parameter being based on the at least two operational parameters, and the first threshold being based on a type of operations being performed by the processing core; and reduce an operating condition of the processing core in response to determining the bandwidth parameter satisfies the first threshold.

9. The computing device of claim 8, wherein the traffic monitor module is further configured to:

monitor an execution performance of the processing core at the reduced operating condition;

determine whether a change in the execution performance satisfies a second threshold;

increase the operating condition of the processing core in response to determining that the execution performance satisfies the second threshold; and continue monitoring the at least two operational parameters of the system interface in response to determining that the execution performance does not satisfy the second threshold.

10. The computing device of claim 9, wherein the monitored execution performance is a rate of instructions retired from a register.

11. The computing device of claim 8, wherein the at least two operational parameters are two of:

an average memory latency of the memory;

a processing core read bandwidth of the system interface; or an arithmetic logic unit (ALU) utilization of the processing core.

12. The computing device of claim 8, wherein the operating condition is a frequency of clock signals provided to the processing core.

13. The computing device of claim 8, wherein the traffic monitor module is configured to reduce the operating condition of the processing core by reducing an execution rate of the processing core by a predetermined number of executions per unit time.

14. The computing device of claim 8, wherein the processing core is a graphical processing unit (GPU) and the traffic monitor module is configured such that the bandwidth parameter depends upon parameters determined based on a processing load associated with a type of operations being performed by the GPU.

15. A traffic monitor module for use in a computing device, the traffic monitor module comprising at least one processor configured to:

monitor at least two operational parameters of a system interface between a processing core and a memory;

determine whether a bandwidth parameter satisfies a first threshold, the bandwidth parameter being based on the at least two operational parameters, and the first threshold being based on a type of operations being performed by the processing core; and reduce an operating condition of the processing core in response to determining the bandwidth parameter satisfies the first threshold.

16. The traffic monitor module of claim 15, wherein the processor is further configured to:

monitor an execution performance of the processing core at the reduced operating condition;

determine whether a change in the execution performance satisfies a second threshold;

increase the operating condition of the processing core in response to determining that the execution performance satisfies the second threshold; and continue monitoring the at least two operational parameters of the system interface in response to determining that the execution performance does not satisfy the second threshold.

17. The traffic monitor module of claim 16, wherein the monitored execution performance is a rate of instructions retired from a register.

18. The traffic monitor module of claim 15, wherein the at least two operational parameters are two of:

an average memory latency of the memory;

a processing core read bandwidth of the system interface; or an arithmetic logic unit (ALU) utilization of the processing core.

19. The traffic monitor module of claim 15, wherein the operating condition is a frequency of clock signals provided to the processing core.

20. The traffic monitor module of claim 15, wherein the processing core is a graphical processing unit (GPU) and the traffic monitor module is configured such that the bandwidth parameter depends upon parameters determined based on a processing load associated with a type of operations being performed by the GPU.

* * * * *